US010428861B2

(12) United States Patent
Mason

(10) Patent No.: US 10,428,861 B2
(45) Date of Patent: Oct. 1, 2019

(54) LOOSE WHEEL NUT INDICATOR AND RESTRAINER

(71) Applicant: MARCHMONT PTY LIMITED, Redlynch (AU)

(72) Inventor: Ronald Robert Mason, Redlynch (AU)

(73) Assignee: MARCHMONT PTY LIMITED (AU)

( * ) Notice: Subject to any disclaimer, the term of this patent is extended or adjusted under 35 U.S.C. 154(b) by 156 days.

(21) Appl. No.: 15/514,538

(22) PCT Filed: Apr. 20, 2016

(86) PCT No.: PCT/AU2016/000134
§ 371 (c)(1),
(2) Date: Mar. 27, 2017

(87) PCT Pub. No.: WO2016/168883
PCT Pub. Date: Oct. 27, 2016

(65) Prior Publication Data
US 2017/0227042 A1    Aug. 10, 2017

(30) Foreign Application Priority Data
Apr. 20, 2015 (AU) ................................ 2015901412

(51) Int. Cl.
*F16B 39/10* (2006.01)
*B60B 3/16* (2006.01)
*F16B 1/00* (2006.01)

(52) U.S. Cl.
CPC ............. *F16B 39/101* (2013.01); *B60B 3/16* (2013.01); *B60B 3/165* (2013.01); *F16B 1/0071* (2013.01);
(Continued)

(58) Field of Classification Search
CPC ...... F16B 1/0071; F16B 33/02; F16B 33/028; F16B 39/10; F16B 39/101; F16B 39/24; F16B 43/00; B60B 3/16; B60B 3/165
(Continued)

(56) References Cited

U.S. PATENT DOCUMENTS 1,741,077 A * 12/1929 Rusack .................. F16B 39/10
411/91
5,624,218 A * 4/1997 Dauwalter ............ F16B 39/101
411/373
(Continued)

FOREIGN PATENT DOCUMENTS

| GB | 2406365 B | 7/2006 |
| GB | 2510170 A | 7/2014 |
| WO | 2015000013 A1 | 1/2015 |

OTHER PUBLICATIONS

Patent Cooperation Treaty (PCT), International Search Report for Application PCT/AU2016/000134 filed Apr. 20, 2016, dated Jun. 15, 2016, International Searching Authority, AU.

*Primary Examiner* — Roberta S Delisle
(74) *Attorney, Agent, or Firm* — McDonald Hopkins LLC

(57) ABSTRACT

An apparatus (10) for visually indicating a loose wheel nut (57) on a wheel of a motor vehicle has a plurality of wheel nut engaging members (12, 14, 16, 18, 20). Each wheel nut engaging member is rotatable with a respective wheel nut to which it is engaged and has a pointer (26) for indicating a start position of the wheel nut engaging member. Any two adjacent wheel nut engaging members of the plurality are interconnected by an elongate member (28) which is resiliently flexible so as to define an endless configuration of spaced apart but interconnected wheel nut engaging members. In use, any loosening rotation of a first wheel nut (57) will cause the engaging member (12) which engages that wheel nut and its pointer (26) to rotate therewith, thereby (Continued)

providing a visual indication of a loosening of that wheel nut.

10 Claims, 8 Drawing Sheets

(52) U.S. Cl.
CPC ..... *B60B 2310/307* (2013.01); *B60B 2320/52* (2013.01); *B60B 2900/3312* (2013.01)

(58) Field of Classification Search
USPC .......................................... 411/8, 14, 95, 97
See application file for complete search history.

(56) References Cited

U.S. PATENT DOCUMENTS

| | | | | |
|---|---|---|---|---|
| 6,398,312 | B1* | 6/2002 | Marczynski | F16B 1/0071 |
| | | | | 116/212 |
| 7,415,888 | B2* | 8/2008 | Marczynski | B60B 3/145 |
| | | | | 73/761 |
| 7,927,049 | B2* | 4/2011 | Adams | F16B 37/14 |
| | | | | 411/102 |
| 8,152,426 | B2* | 4/2012 | Marczynski | F16B 1/0071 |
| | | | | 411/121 |
| 8,337,129 | B2* | 12/2012 | Boyce | F16B 31/028 |
| | | | | 411/102 |
| 8,708,627 | B2* | 4/2014 | Davies | F16B 39/101 |
| | | | | 411/102 |
| 9,057,396 | B2* | 6/2015 | Prince | F16B 39/101 |
| 9,947,151 | B2* | 4/2018 | Ellis | B60Q 5/005 |
| 2004/0181924 | A1* | 9/2004 | Saunders, II | B60B 3/165 |
| | | | | 29/426.5 |

* cited by examiner

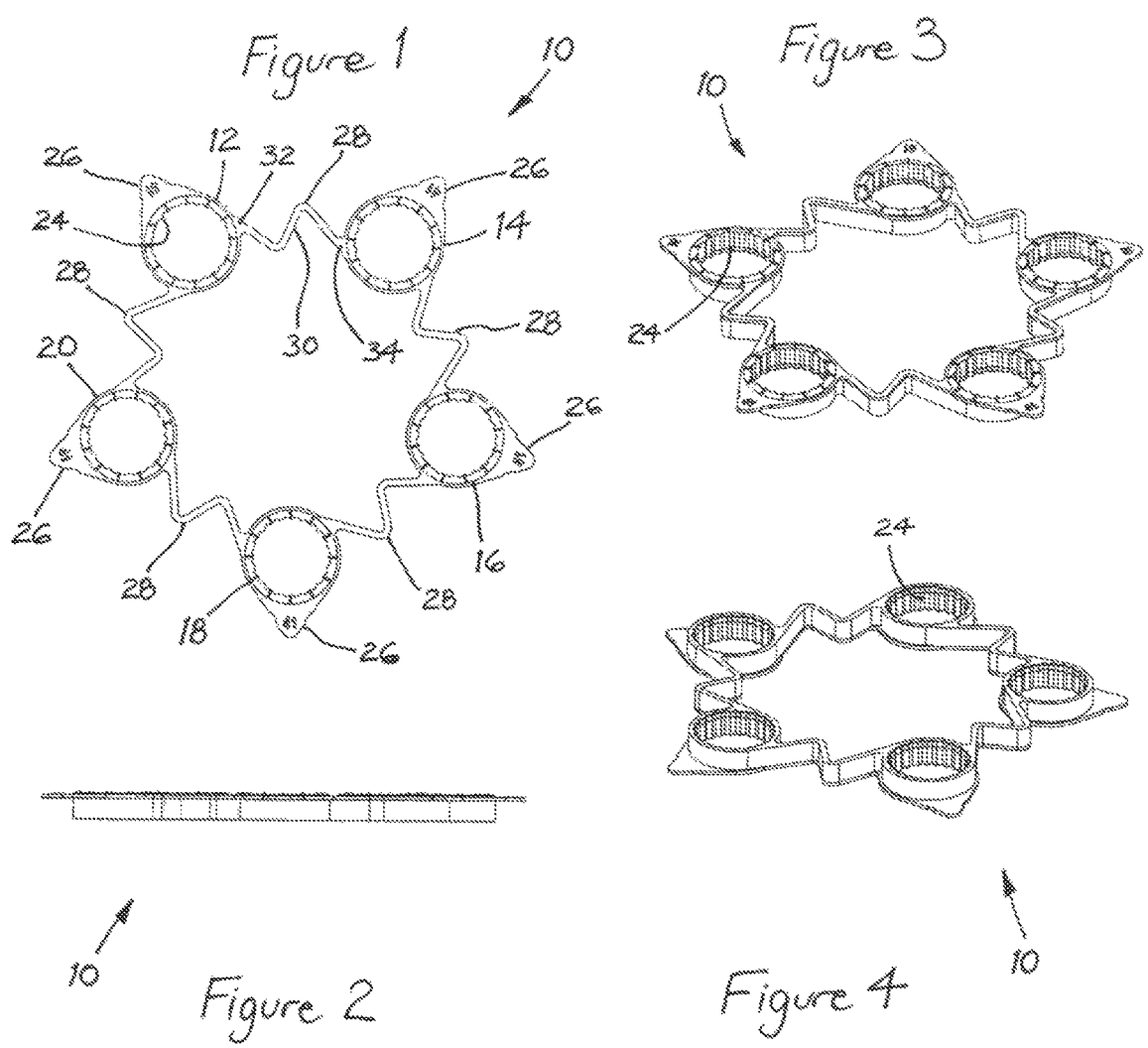

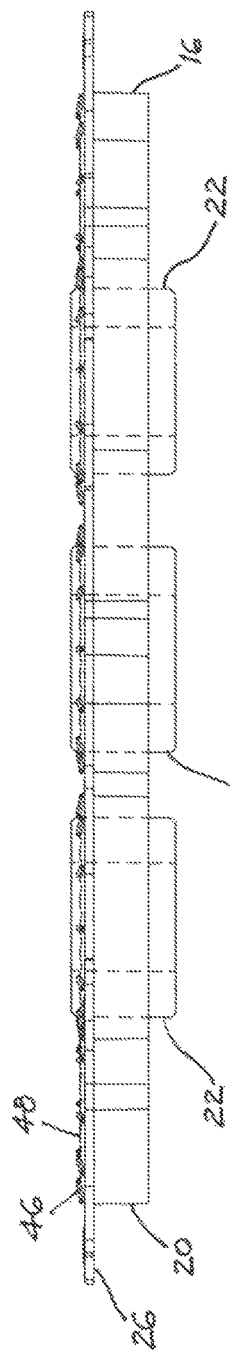
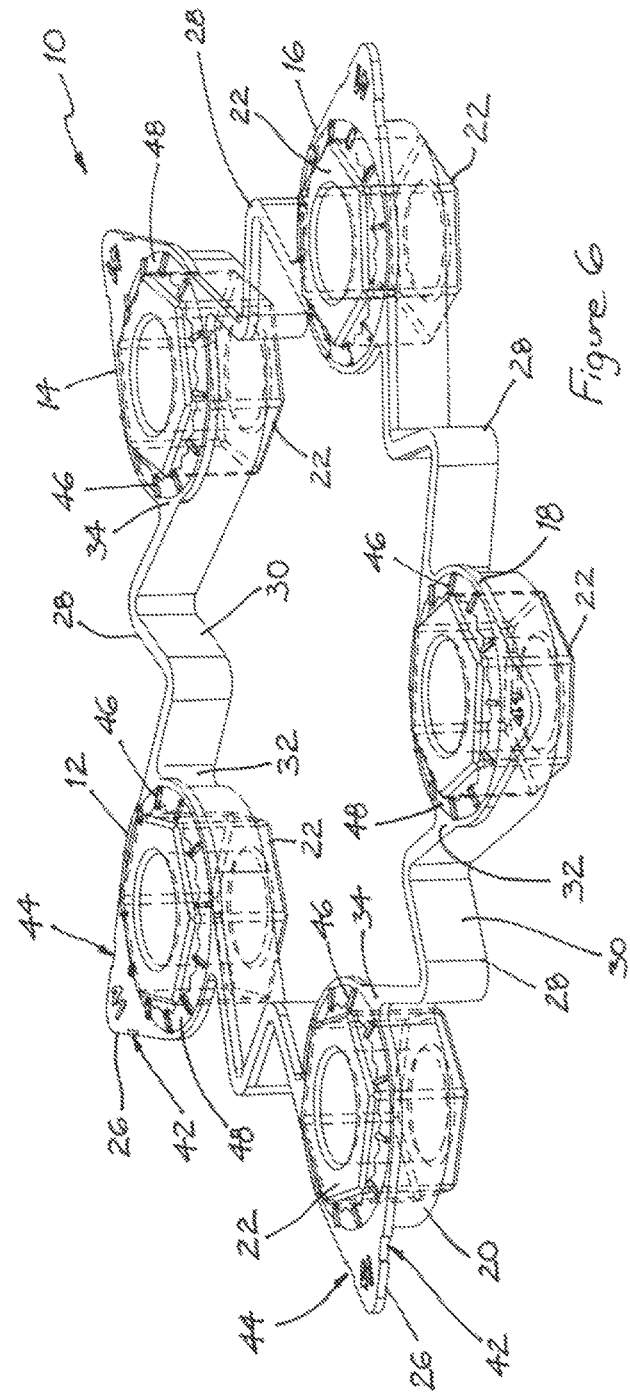

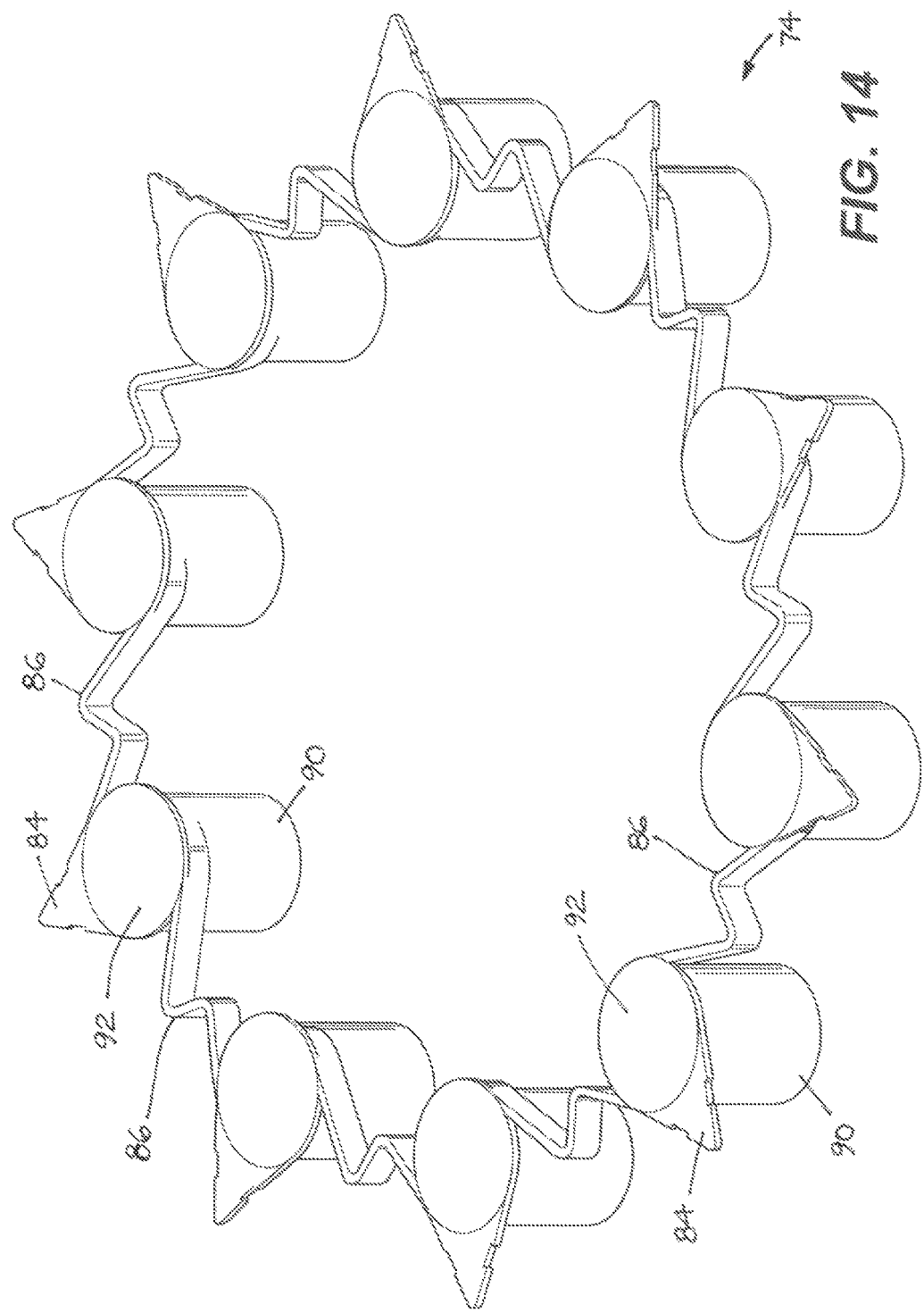

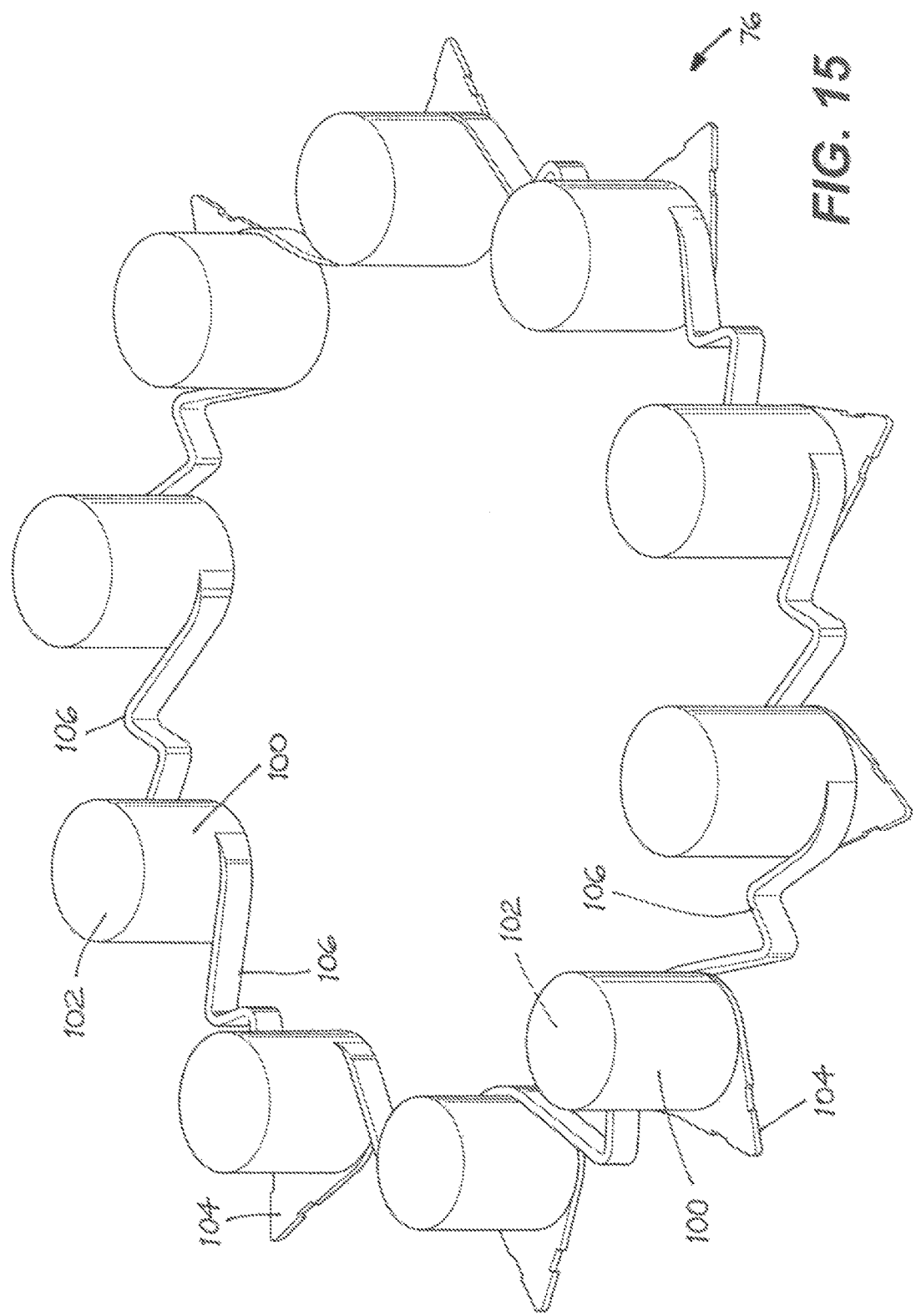

LOOSE WHEEL NUT INDICATOR AND RESTRAINER

CROSS REFERENCE TO RELATED APPLICATIONS

This application is a 35 U.S.C. § 371 national stage application of and claims priority to International Application No. PCT/AU2016/000134 filed on Apr. 20, 2016, entitled "IMPROVED LOOSE WHEEL NUT INDICATOR AND RESTRAINER," which claims priority to and the benefit of Australian Application Serial No. 2015901412, filed Apr. 20, 2015, and entitled "IMPROVED LOOSE WHEEL NUT INDICATOR AND RESTRAINER," both of which are incorporated herein by reference.

TECHNICAL FIELD

The present invention relates to a loose wheel nut indicator and, in particular, to an apparatus for visually indicating a loose wheel nut of a road motor vehicle. More particularly, the present invention relates to such an apparatus which may also be used to prevent any loosening of a wheel nut which is adjacent to the loose wheel nut, such that any further loosening of the loose wheel nut is restrained.

BACKGROUND ART

Road motor vehicles commonly have disc wheels which are held onto a hub of an axle by a plurality of wheel nuts, usually six, eight or ten in number, that are adapted to be threadably engaged to a corresponding number of studs equally spaced in a circle around the hub flange. The studs pass through holes in the wheel disc, and the wheel is secured to the hub by screwing the nuts tightly onto the studs and against the wheel disc to the correct torque.

However, the wheel nuts may loosen over time due to continuous or prolonged vibration of the vehicle and its front and rear axles. This problem may be particularly pronounced in heavy road motor vehicles and many other commercial road vehicles, which may have a larger number of axles, more than one wheel held on any one side of each axle, and very large and heavy wheels which make tightening of the nuts relatively difficult.

The tendency for wheel nuts to loosen over time in all road motor vehicles may be accelerated by a number of factors. These include a failure to initially tighten the nuts to the correct torque, the fitting of an incorrect wheel nut, the regular overtightening of the nuts with automated tools that cause stretching and fatigue of the studs, and the "settling" of the wheel on the hub that may occur after a wheel change which causes the force of the nut on the wheel disc to be reduced.

Loosening of the wheel nuts can have serious adverse consequences. If a wheel nut becomes loose while the vehicle is in motion, the wheel may experience an increased radial load which, if unchecked, can cause severe damage to the wheel itself and/or to the stud, hub and possibly even the nut. In extreme cases, the wheel nut may unscrew from its stud or the wheel may sever the stud due to excessive bending loads, causing the wheel to detach from the hub with potentially disastrous results.

There have been many and varied attempts to address these problems, most of which have met with little or no success.

One approach has involved finding ways of preventing wheel nuts from becoming loose.

Apart from maintaining regular inspection and, if required, correction of wheel nut tighteners, well known self locking nut systems have been developed which rely on an interference fit between the thread on the stud and the thread on the nut to create a lock which stiffens the rotation of the nut, either by a portion of the nut thread being deformed and providing a resistance during the threaded engagement, or by locating a nylon or other deformable insert within the threaded bore of the nut and through which the stud cuts the thread against a stiffening resistance.

A problem with self locking nut systems is that they are designed to operate at maximum locking effectiveness for one tightening cycle only and, if used more than once, will have markedly reduced locking capability. Furthermore, the self locking nut cannot be tightened quickly by hand in the initial stage of its threaded engagement with the stud because the lock stiffens the rotation of the nut, with the result being that a spanner or other tool is required also at the initial stage, thereby considerably lengthening the time it takes to tighten the wheel nut and hence attach the wheel to the hub. These problems and shortcomings may be unacceptable to many users given that a wheel nut may have to be removed many times during the life of a vehicle. Replacement of worn out or damaged nuts would also become very expensive.

Another approach has involved finding ways to visually indicate in a timely manner when a wheel nut becomes loose so that appropriate intervention can occur to retighten or replace the nut before serious damage results.

It is known to provide loose wheel nut indicators in the form of one piece polymeric rings or caps which are firmly clipped around or over an individual wheel nut and which include a pointed or arrowhead portion to visually indicate any loosening of the wheel nut by its unwanted rotation.

A problem with loose wheel nut indicators of the type described above is that the arrowhead portion needs to be pointing in a predetermined start direction, thus having a start position, and any indication of wheel nut loosening must require the identification of deviation from that initial direction and position. In many cases, loosening of a wheel nut that may lead to problems could result from a rotation of greater than about 5°, but for rotations from about 5° to up to about 20°, identification of such deviation may be very difficult to visually detect or may be missed altogether with the use of such one piece, clip on, pointed indicators.

Furthermore, these indicators operate on individual wheel nuts, and so any loosening of one nut is independent of the behaviour of any of the other nuts. Therefore, each indicator does not have any means of preventing any other nut from loosening or of restraining any further loosening of the already loosened nut.

Australian Innovation Patent No. 2010 101 053, now ceased, discloses a loose wheel nut indicator in the form of a cap or cover having a body that can closely fit over a tightened nut so as to be rotatable with the nut, and which includes a dial or other means that is rotatable relative to the nut for visibly indicating any loosening of the nut. This indicator is complex in its construction, requiring both a body and a dial which are separately manufactured, together with a complex structure for their cooperation with the nut, and furthermore operates only on individual nuts.

International Patent Application No. PCT/AU2014/000363 by the present inventor discloses a loose wheel nut indicator in the form of a pair of rings or caps which engage a respective pair of adjacent wheel nuts and which are rotatable with their respective wheel nut. The pair of rings or caps is interconnected by a resiliently flexible elongate member which is configured to curve in at least two directions. Each ring or cap of the pair has a pointer such that any loosening rotation of one of the wheel nuts will cause the ring or cap, and its pointer, to rotate therewith, thereby providing a visual indication of a loosening of that wheel nut. That indicator, although reliable and simple to use, can only be engaged to a pair of adjacent wheel nuts, and since a wheel of a motor vehicle typically has a much larger number of wheel nuts, more than one such indictor would be required for such a wheel. This may bring with it problems associated with requiring, engaging, removing and storing more than one indicator for each wheel of a motor vehicle or fleet of vehicles. It also poses a significant problem when there is an odd number of wheel nuts on a wheel because, after engaging such an indicator to each pair of adjacent wheel nuts, there will always be one wheel nut that is not engaged.

DISCLOSURE OF INVENTION

It is an object of the present invention to provide a loose wheel nut indicator that overcomes, or at least substantially ameliorates, the problems and shortcomings of the aforementioned prior art, or at least provides a useful alternative.

According to the present invention, there is provided an apparatus for visually indicating a loose wheel nut on a wheel of a motor vehicle, comprising a plurality of wheel nut engaging members, each engaging member being rotatable with a respective wheel nut to which it is engaged and having a pointer for indicating a start position of the engaging member, any two adjacent engaging members of the plurality being interconnected by an elongate member which is resiliently flexible so as to define an endless configuration of spaced apart but interconnected engaging members, wherein, in use, any loosening rotation of a first wheel nut will cause the engaging member which engages that wheel nut and its pointer to rotate therewith, thereby providing a visual indication of a loosening of that wheel nut.

Preferably, the elongate member is configured such that any straightening of the elongate member caused by loosening of the first wheel nut will cause the elongate member to apply a compressive tension on a second engaging member to which the elongate member is connected, thereby countering any loosening rotation of a second wheel nut to which the second engaging member is engaged so as to prevent any loosening thereof.

Preferably, the elongate member is configured such that the compressive tension applied on the second engaging member will cause the elongate member to apply a compressive tension on the first engaging member, thereby countering any further loosening rotation of the first wheel nut so as to restrain any further loosening thereof.

It is preferred that each of the wheel nut engaging members is selected from the group consisting of rings, caps, loops and covers.

Each of the wheel nut engaging members may, in some preferred embodiments, be a ring having spaced apart transverse grooves formed on the inwardly facing surface of the ring so as to grip the wheel nut around its angled corners.

Alternatively, each of the wheel nut engaging members may be a cap having spaced apart transverse grooves formed on the inwardly facing surface of the cap so as to grip the wheel nut around its angled corners.

In a preferred form, the elongate member is configured to include the general shape of a zig zag.

Preferably, each of the pointers comprises an arrowhead formed integrally with the respective engaging member.

The plurality of wheel nut engaging members may consist of an odd number of wheel nut engaging members.

According to another aspect of the present invention, there is provided a method for visually indicating a loose wheel nut on a motor vehicle, including the steps of:
(a) providing an apparatus according to the present invention,
(b) engaging the wheel nut engaging members with respective wheel nuts, wherein the start position of each of the engaging members is indicated by its respective pointer, and
(c) visually monitoring any rotation of the pointer of any of the engaging members to indicate a loosening of the respective wheel nut.

BRIEF DESCRIPTION OF THE DRAWINGS

In order that the invention may be more readily understood and put into practical effect, reference will now be made to the accompanying drawings, in which:

FIG. 1 is a plan view of a loose wheel nut indicating apparatus according to a preferred embodiment of the present invention, FIG. 2 is a side view of the apparatus of FIG. 1, FIG. 3 is a perspective view from the top of the apparatus of FIG. 1, FIG. 4 is a perspective view of the apparatus of FIG. 1 when it is upside down, FIG. 5 is a side view of the apparatus of FIG. 1 when partly engaged with only three nuts, FIG. 6 is a perspective view from the top of the apparatus of FIG. 1 when fully engaged with all five nuts of a wheel, FIG. 14 is a perspective view from the top of a loose wheel nut indicating apparatus according to yet another preferred embodiment of the present invention when fully engaged with all ten nuts of a wheel and showing all of the pointers of the apparatus in a start position at the time of fitting, and FIG. 15 is a perspective view from the top of a loose wheel nut indicating apparatus according to still another preferred embodiment of the present invention when fully engaged with all ten nuts of a wheel and showing all of the pointers of the apparatus in a start position at the time of fitting.

MODES FOR CARRYING OUT THE INVENTION

Figure 7:
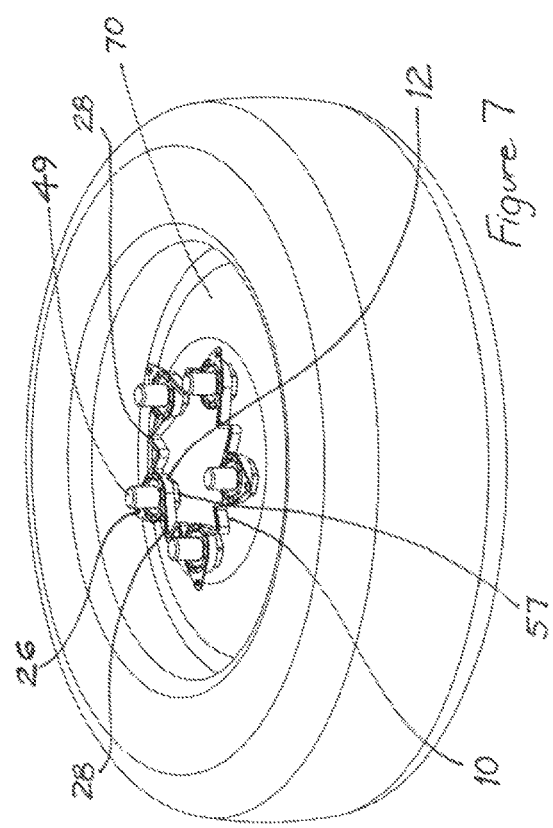
FIG. 7 is a perspective view of a wheel shown fitted with the apparatus of FIG. 1 when fully engaged with all five nuts of the wheel and showing all of the pointers of the apparatus in a start position at the time of fitting.
Figure 8:
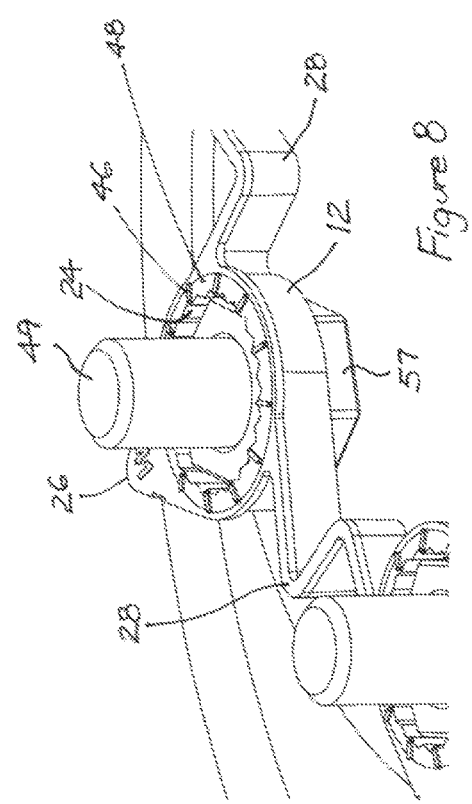
FIG. 8 is an enlarged view of a portion of FIG. 7 showing a first nut engaging member with its pointer in the start position.

The apparatus 10 shown individually in FIGS. 1 to 4 and shown in use in FIGS. 5 to 12 is to be used primarily for visually indicating a loose wheel nut on a wheel of a road motor vehicle, but may also be used to prevent any loosening of an adjacent wheel nut which, in turn, may restrain any further loosening of the loose wheel nut.

The apparatus 10 has a plurality of wheel nut engaging members 12, 14, 16, 18, 20 for engaging around respective wheel nuts (as shown by numeral 22 in FIGS. 5 and 6 and by numerals 57, 58, 59, 60 and 61 in FIGS. 7 to 12) which are adjacent to each other and arranged as a part of a conventional, equally spaced, circular arrangement of wheel nuts engaged to wheel studs around the hub flange of a disc wheel. The apparatus 10 therefore defines an endless configuration of spaced apart wheel nut engaging members 12, 14, 16, 18 and 20. In the present embodiment as shown in FIGS. 1 to 12, the engaging members are rings, but they may alternatively be caps, loops, covers or other suitable means for engaging all of the wheel nuts on a wheel.

The rings 12, 14, 16, 18, 20 are rotatable with their respective wheel nut by having, in this embodiment, spaced apart transverse grooves 24 formed on their inwardly facing surface so as to grip the wheel nut around its angled corners. Such common rotation may alternatively be due to some other form of profile or shape on one or more inwardly facing surface of the wheel nut engaging member which creates the necessary grip, or due to the tightness with which the wheel nut engaging member grips the nut. In this embodiment, and as shown in FIG. 6, each ring has a tapered lower inner edge for receiving and accommodating wheel nuts of varying sizes.

The rings 12, 14, 16, 18, 20 have a respective pointer 26 which indicates a start position of each ring. Each pointer 26 is, in this embodiment, in the shape of an arrowhead and is formed integrally with its ring. Alternatively, the pointer may be in the form of a barb or be otherwise wedge shaped, or may comprise some other form of a visual indicator of a start position, such as a printed, grooved or embossed line.

Any two adjacent rings of the apparatus 10 are interconnected by an elongate member 28 which is made of a resiliently flexible material, such as polypropylene or a low density polyethylene (LDPE) or other suitable polymer material, so as to define an endless configuration of spaced apart rings which are interconnected by individual elongate members 28.

The apparatus 10 has a pair of cut-outs 42, 44 formed on opposite sides of each pointer 26, and has a plurality of raised lines 46 or ribs formed on the upper surface of an upwardly projecting annulus portion 48 immediately surrounding the grooves 24 of each ring 12, 14, 16, 18, 20. In this embodiment, there are twelve raised lines 46 which are equidistant and radially spaced apart from each other, but the number of such lines may vary or they may be absent.

In this embodiment, the elongate members 28 are formed integrally with the rings 12, 14, 16, 18, 20 which are thus made of the same polymer material as the elongate members, such as by a plastic injection moulding process. Alternatively, the rings 12, 14, 16, 18, 20 may be made of a different material to the elongate members 28 and the separate components connected together under suitable heat and pressure conditions or by other suitable connecting means.

Each elongate member 28 is configured to curve in at least two directions. In this embodiment, where the nut tightening direction is clockwise, this curved configuration of the elongate member 28 is in the general shape of a zig zag, although the curved configuration may alternatively be in a general serpentine shape or in the shape of some other wave form or the letter Z.

Generally, each elongate member must be configured in such a way as to be clear of, and not interfere with, any central drive axle assembly of a wheel to which the apparatus 10 is engaged, so long as each elongate member remains resiliently flexible.

As best shown in FIG. 1, the elongate member 28 curves in two directions with a central linear region 30 therebetween. There are first and second joining portions 32, 34 of the elongate member 28 at respective opposite ends thereof. The joining portions 32, 34 are connected to the respective rings of any two adjacent rings of the plurality.

The resiliently flexible elongate members 28 allow the apparatus of the present invention to radially expand and contract in order to engage wheels having different spacing of wheel nuts (and of the studs 49 to which the nuts are fitted) from a centre point of the wheels.

In this embodiment, each of the first and second joining portions 32, 34 is connected to its respective ring in a direction that is generally tangential thereto, although other suitable directions at which the joining portions 32, 34 are connected to the rings are within the ambit of the invention, such as perpendicular directions.

Advantageously, and referring to the drawing of FIG. 1, the joining portion 32 at the left end of the elongate member 28 (when observing it from inside the apparatus 10, such as from a centre point of a wheel to which the apparatus 10 is engaged) is connected to the ring 12 at a location of the ring which, if the direction of the pointer 26 corresponds to the twelve position for an hour hand of a clock (or 0° of arc), corresponds to between the three and four position for the hour hand of the clock (or 90° to 120° of arc), and the joining portion 34 at the right end of the elongate member 28 is connected to the ring 14 at a location of the ring which corresponds to between the seven and eight position for the hour hand of the clock (or 210° to 240° of arc).

This connection configuration is most useful, where the wheel nut tightening direction is clockwise, for enhancing the visual indication of a loose wheel nut (which loosens in an anticlockwise direction) and for enhancing the prevention of any loosening of an adjacent wheel nut which, in turn, may enhance the restraining of further loosening of the loose wheel nut.

In use, an apparatus 10 is engaged to all of the wheel nuts on a disc wheel of a road motor vehicle. This is especially shown in FIGS. 7, 8 and 11.

The start position, in this instance of use, of each of the rings 12, 14, 16, 18, 20 indicated by the respective pointer 26 is such that the pointer 26 is directed, or points radially, outwardly from a centre point of the wheel and from which the wheel nuts are equally spaced.

Alternatively, the start position may be such that the pointers are directed, or point radially, inwardly toward the centre point, or may be such that the pointers are aligned with the direction of rotation of the wheel.

Alternatively, the start position may, if there are an even number of wheel nuts on a wheel that need to be engaged by the apparatus of the present invention, be such that the pair of pointers of each adjacent pair of wheel nut engaging members point toward each other.

Figure 9:
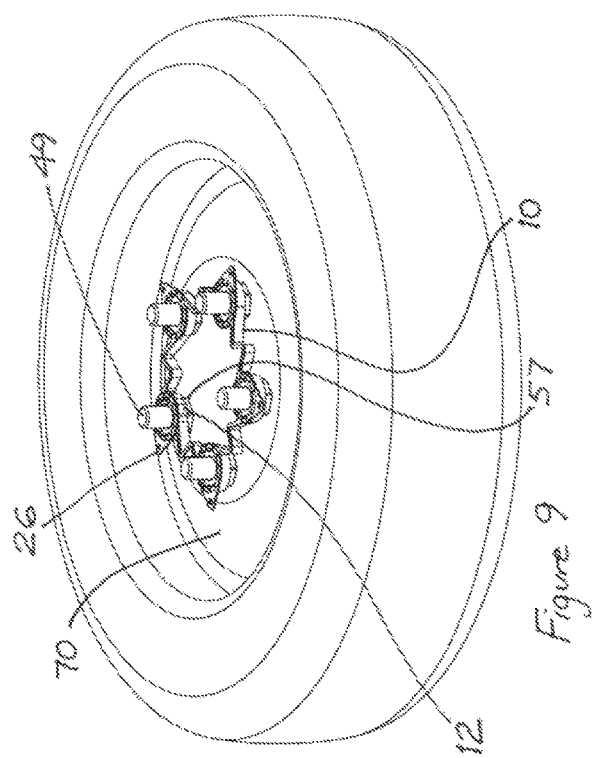
FIG. 9 is a perspective view of the wheel fitted with the apparatus as shown in FIGS. 7 and 8, and showing the pointer of the first nut engaging member in a partly rotated position indicating a loosening of the wheel nut to which that wheel nut engaging member is engaged.
Figure 10:
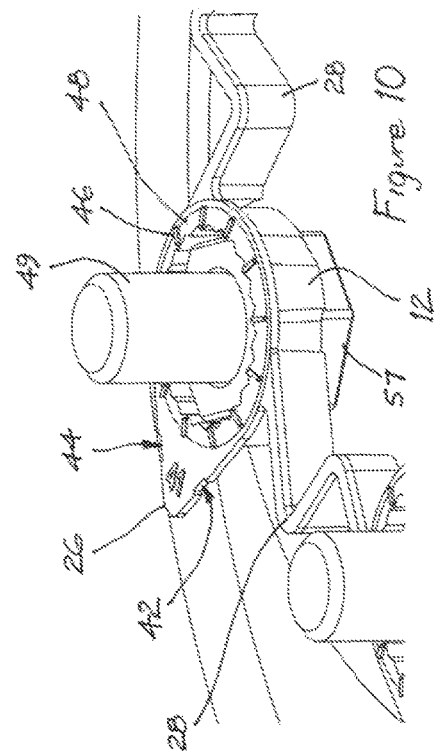
FIG. 10 is an enlarged view of a portion of FIG. 9 showing the first nut engaging member with its pointer in the partly rotated position.

Any loosening rotation of a first wheel nut will cause the ring which engages that wheel nut, say, ring 12 and its pointer 26, to rotate therewith, thereby providing a visual indication of a loosening of the first wheel nut. This will also cause the elongate member 28 connected to the right side of the ring (when observing it from inside the apparatus 10) to become straighter and the elongate member 28 connected to the left side of the ring to become straighter, and so provide a further visual indication of the loose first wheel nut. This is shown in FIGS. 9 and 10 and is especially apparent in FIG. 12 with regard to wheel nut 57.

Furthermore, the connection configuration of the elongate members 28 is such that any straightening of the elongate members 28 on both sides of the ring 12 caused by loosening of the first wheel nut 57 which is engaged by ring 12 will cause the elongate members 28 to apply a compressive tension on each of the rings 14, 20 which are on opposite sides of the ring 12, thereby countering or preventing any loosening rotation of the wheel nuts 58, 61 which are engaged by rings 14, 20, respectfully, so as to prevent any loosening thereof.

Moreover, the connection configuration of the elongate members 28 is such that the compressive tension applied on each of the rings 14, 20 will cause the elongate members 28 to apply a compressive tension on the ring 12, thereby countering or preventing any further loosening rotation of the first wheel nut 57 so as to restrain any further loosening thereof.

Figure 11:
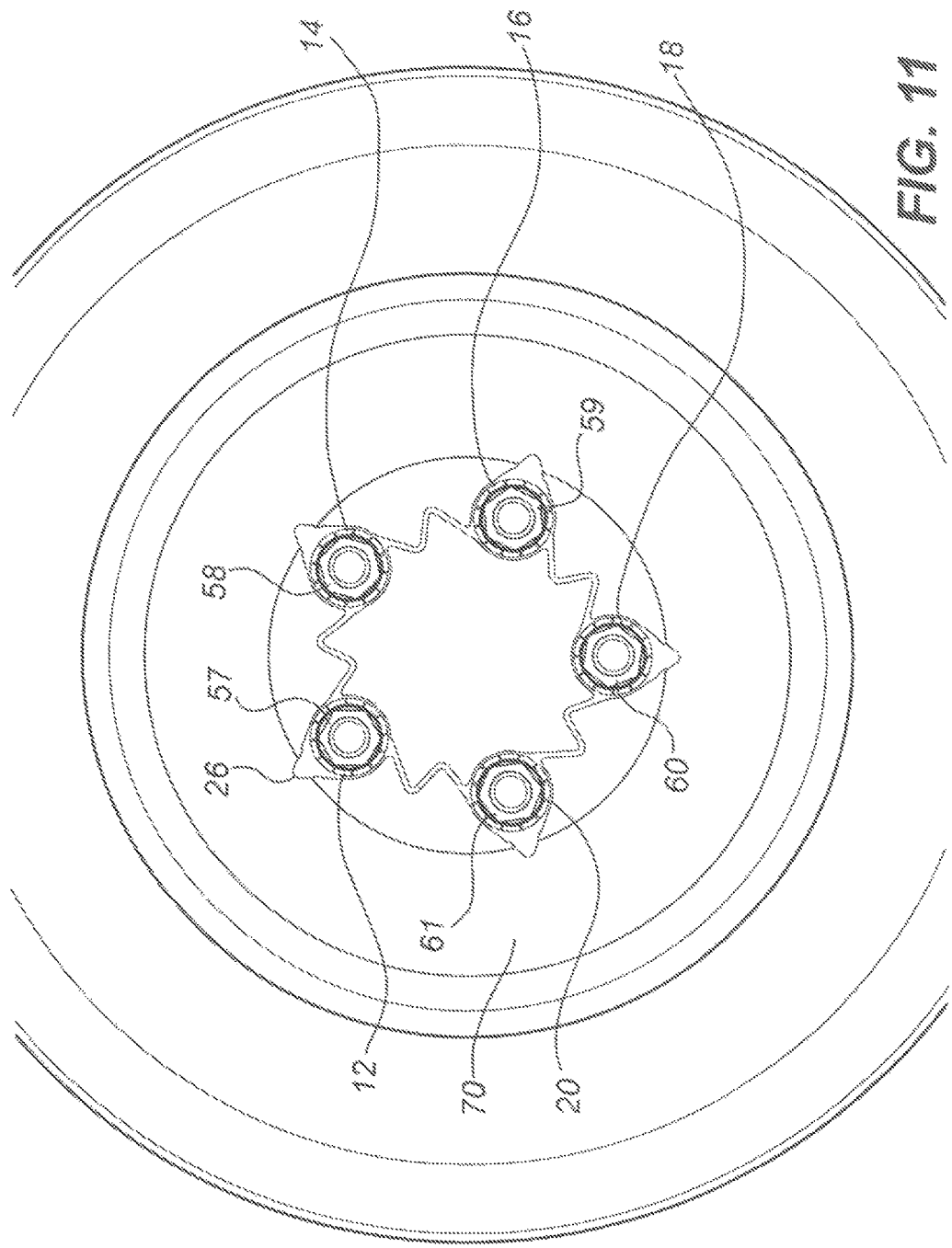
FIG. 11 is a plan view of a wheel shown fitted with the apparatus of FIG. 1 when fully engaged with all five nuts of the wheel and showing all of the pointers of the apparatus in a start position at the time of fitting.
Figure 12:
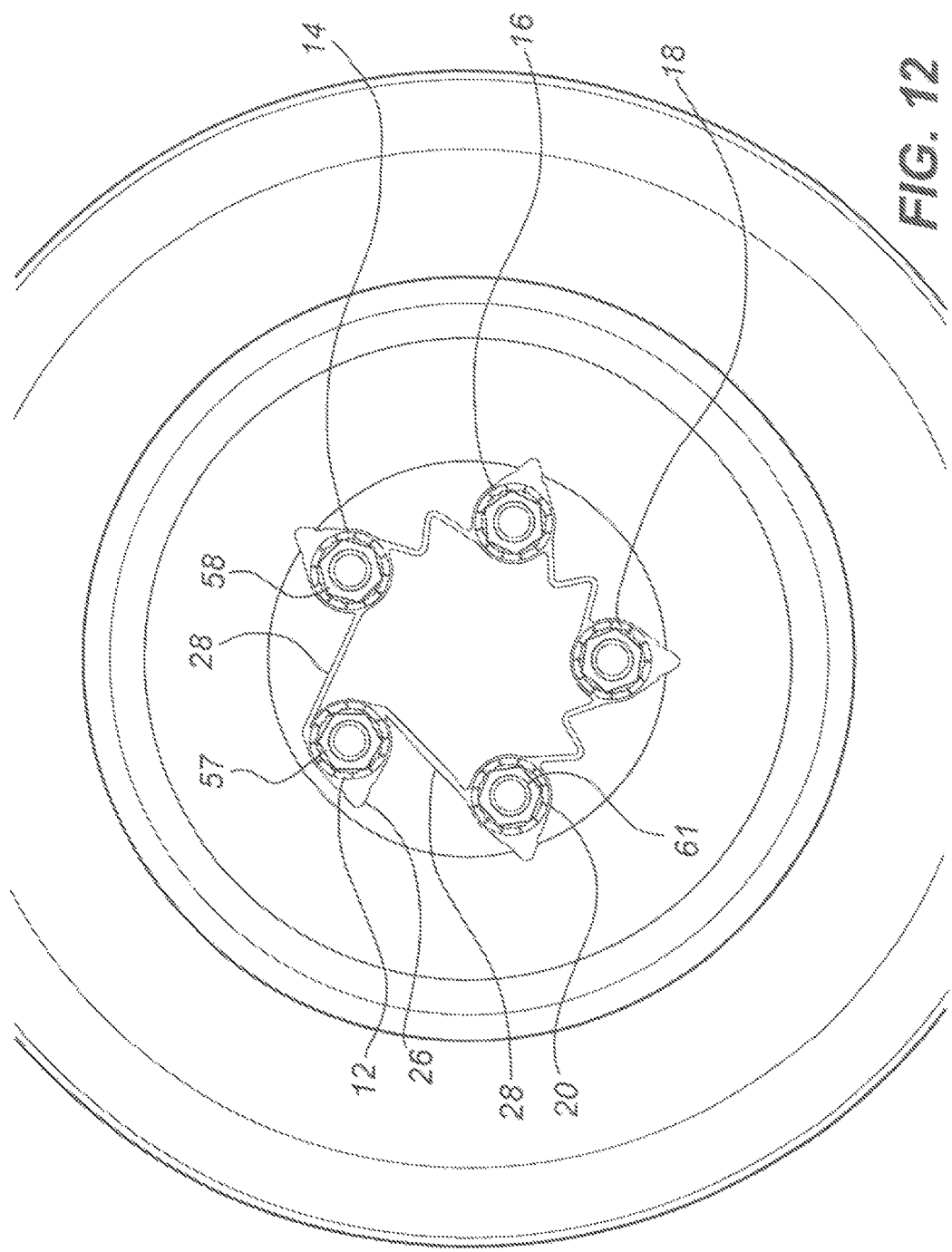
FIG. 12 is a plan view of the wheel fitted with the apparatus as shown in FIG. 11, and showing the pointer of a nut engaging member in a fully rotated position indicating a further loosening of the wheel nut to which the wheel nut engaging member is engaged.

By way of specific example, FIGS. 11 and 12 show the use of the apparatus 10 shown in FIGS. 1 to 4 engaged to all of the wheel nuts 57, 58, 59, 60, 61 on a disc wheel 70 of a road motor vehicle.

FIG. 11 shows the start position of the pointer 26 of each ring 12, 14, 16, 18, 20 of the apparatus 10. The pointer 26 of each ring of the apparatus 10 points in a direction that is radially outward from a centre point of the wheel.

FIG. 12 shows that, with use of the wheel, there has been a loosening (counter clockwise) rotation of the wheel nut 57 to which ring 12 is engaged. This has caused the ring 12 and its respective pointer 26 to rotate therewith, thereby providing a visual indication of a loosening of the nut 57. This has also caused the elongate members 28 on both sides of the ring 12 to straighten, and so provide a further visual indication of the loose wheel nut 57.

The straightening of the elongate members 28 has also applied a compressive tension on the rings 14 and 20 (such that the rings 14 and 20 would apply a tightening clockwise rotation force on the nuts 58 and 61, respectively), thereby countering or preventing any loosening (counter clockwise) rotation of the wheel nuts 58 and 61 so as to prevent any loosening thereof.

The compressive tension applied on the rings 14 and 20 has also caused the elongate members 28 to apply a compressive tension on the ring 12, thereby countering or preventing any further loosening rotation of the wheel nut 57 so as to restrain any further loosening thereof.

Figure 13:
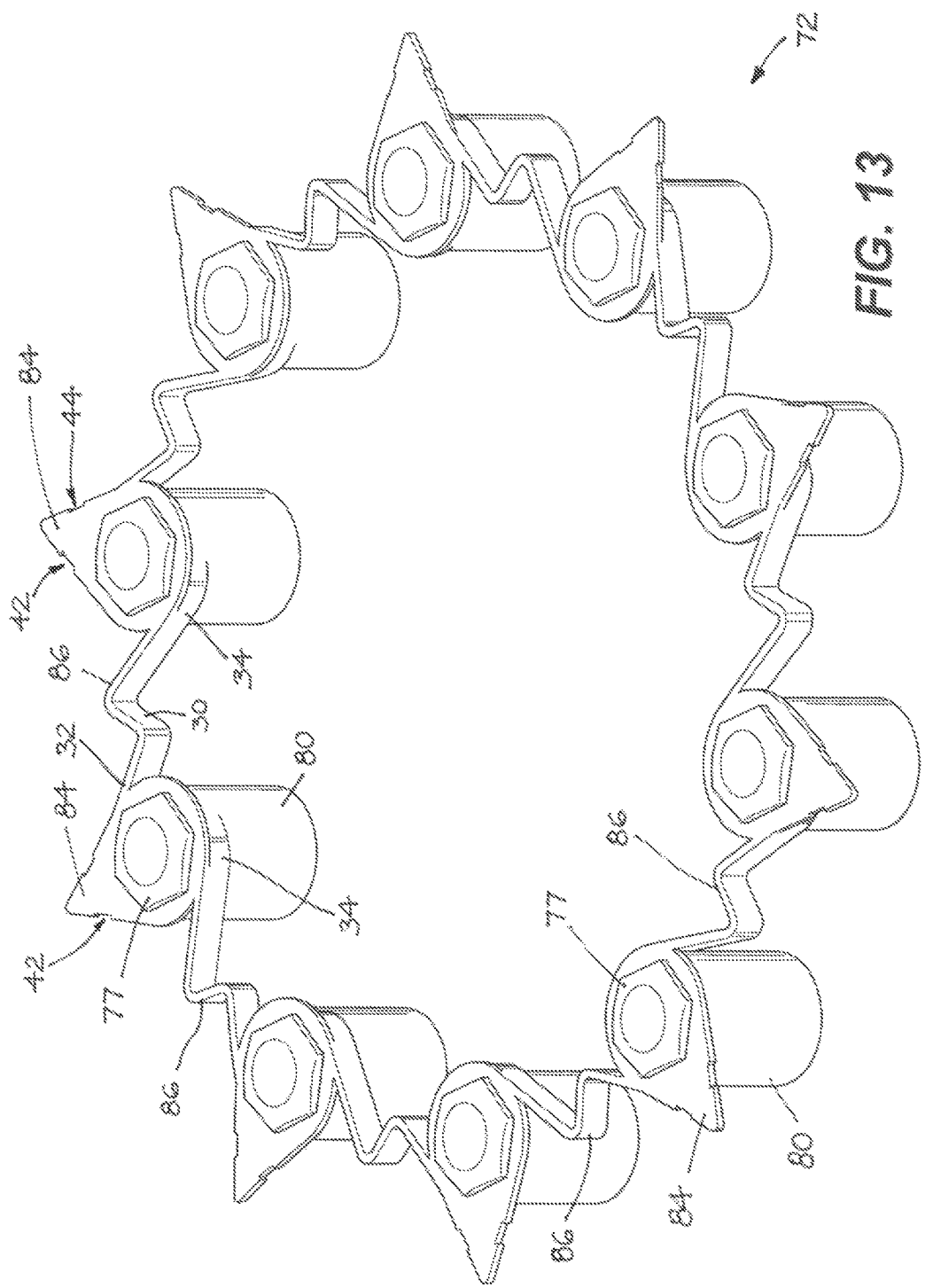
FIG. 13 is a perspective view from the top of a loose wheel nut indicating apparatus according to another preferred embodiment of the present invention when fully engaged with all ten nuts of a wheel and showing all of the pointers of the apparatus in a start position at the time of fitting.

The apparatus 72 shown in use in FIG. 13, the apparatus 74 shown in use in FIG. 14, and the apparatus 76 shown in use in FIG. 15 are each engaged to all of the ten wheel nuts 77 of a respective disc wheel 70 of a road motor vehicle, and are used for generally the same purpose as the apparatus 10. Unless otherwise stated, the structure and function of each of the apparatus 72, 74 and 76 shown in FIGS. 13, 14 and 15, respectively, are the same as the structure and function of the apparatus 10 described hereinbefore with reference to FIGS. 1 to 12, and like features may be identified by like numerals.

As shown in FIG. 13, the wheel nut engaging members of apparatus 72 are extended rings 80, each of which engages a respective wheel nut 77 which is recessed on a wheel 70 in such a way that the extended ring 80 may extend below the wheel disc to the hub flange of the wheel 70 and so fully cover the sides of the nut 77. Such nuts may be said to be recess mounted on the wheel, and are commonly called recessed nuts. In this embodiment, the extended ring 80 is open at its top, or uncapped, whereby the top of the nut 77 is visible. The pointer 84 of each extended, uncapped ring 80 extends from the top of the ring 80, and the elongate member 86 which interconnects any two adjacent rings 80 also extends from the top of the rings 80.

As shown in FIG. 14, the wheel nut engaging members of apparatus 74 are also extended rings 90, similar to the extended rings 80, but in this embodiment, each of the extended rings 90 is closed at its top, or capped, whereby the top of the nut is not visible. The closed top 92, or cap, of the ring 90 is, in this embodiment, slightly dome shaped and is formed integrally with its ring 90.

As shown in FIG. 15, the wheel nut engaging members of apparatus 76 are also extended rings 100, similar to the extended rings 90, whereby each of the extended rings 100 has a closed top 102, or cap, but in this embodiment, each of the pointers 104 of each extended, capped ring 100 extends from the bottom of the ring 100, and the elongate member 106 which interconnects any two adjacent rings 100 also extends from the bottom of the rings 100. Such an extended ring 100, because the pointer 104 and the elongate member 106 are located at the bottom of the ring 100, may not be used with a recessed nut, but may nonetheless provide the nut and its stud with protection from dust, by serving as a dust cap or cover.

It will also be readily apparent to persons skilled in the art that various modifications may be made in details of design and construction of the loose wheel nut indicators and restrainers described above without departing from the scope or ambit of the invention.

The invention claimed is:

1. An apparatus for visually indicating a loose wheel nut on a wheel of a motor vehicle, comprising a plurality of wheel nut engaging members arranged in a ring configuration, each engaging member being rotatable with a respective wheel nut to which it is engaged and having a pointer for indicating a start position of the engaging member, wherein each pair of adjacent engaging members of the plurality of wheel nut engaging members arranged in a ring are interconnected by an elongate member which is resiliently flexible, wherein, the plurality of wheel nut engaging members, pointers and interconnecting elongate members being integrally formed and wherein each of the pointers are oriented uniformly such that in use, any loosening rotation of a first wheel nut will cause the engaging member which engages that wheel nut and its pointer to rotate therewith, thereby providing a visual indication of a loosening of that wheel nut.

2. The apparatus of claim 1 wherein the elongate member is configured such that any deformation of the elongate members caused by loosening of the first wheel nut will cause the elongate members to apply a compressive tension on the second engaging member and the third engaging member to which the elongate members are connected.

3. The apparatus of claim 2 wherein the elongate members are configured such that the compressive tension applied on the second or third engaging member will cause the elongate members to apply compressive tension on the first engaging member, thereby countering any further loosening rotation of the first wheel nut so as to restrain any further loosening thereof.

4. The apparatus of claim 1 wherein each of the wheel nut engaging members is selected from the group consisting of rings, caps, loops and covers.

5. The apparatus of claim 1 wherein each of the wheel nut engaging members is a ring having spaced apart transverse grooves formed on the inwardly facing surface of the ring so as to grip the wheel nut around its angled corners.

6. The apparatus of claim 1 wherein each of the wheel nut engaging members is a cap having spaced apart transverse grooves formed on the inwardly facing surface of the cap so as to grip the wheel nut around its angled corners.

7. The apparatus of claim 1 wherein the elongate member is configured to include the general shape of a zig zag.

8. The apparatus of claim 1 wherein each of the pointers comprises an arrowhead formed integrally with the respective engaging member.

9. The apparatus of claim 1 wherein the plurality of wheel nut engaging members consist of an odd number of wheel nut engaging members.

10. A method for visually indicating a loose wheel nut on a motor vehicle, including the steps of:
 (a) providing an apparatus according to claim 1,
 (b) engaging the wheel nut engaging members with respective wheel nuts, wherein the start position of each of the wheel nut engaging members is indicated by its respective pointer, and
 (c) visually monitoring any rotation of the pointer of any of the wheel nut engaging members to indicate a loosening of the respective wheel nut.

* * * * *